United States Patent [19]
Ammon et al.

[11] Patent Number: 5,489,085
[45] Date of Patent: Feb. 6, 1996

[54] WASTE-GAS PIPING FOR A FILTER DUST MELTING FURNACE

[75] Inventors: Hans Ammon, Wettingen; Jürgen Balg, Nussbaumen; Markus Pfister, Döttingen, all of Switzerland

[73] Assignee: ABB Gadelius KK, Tokyo, Japan

[21] Appl. No.: 370,629

[22] Filed: Jan. 10, 1995

[30] Foreign Application Priority Data

Feb. 4, 1994 [DE] Germany ............... 44 03 432.6

[51] Int. Cl.$^6$ .................................... C21B 7/22
[52] U.S. Cl. ................ 266/155; 266/144; 266/156; 266/157; 266/158
[58] Field of Search ................... 266/144, 155, 266/156, 157, 158

[56] References Cited

U.S. PATENT DOCUMENTS 3,727,587  4/1973  Nebegen .................. 266/155

FOREIGN PATENT DOCUMENTS

| | | |
|---|---|---|
| 2311527 | 12/1976 | Germany . |
| 3214300C2 | 10/1983 | Germany . |
| 2322338C2 | 2/1984 | Germany . |
| 4018408A1 | 12/1991 | Germany . |
| 677739A5 | 6/1991 | Switzerland . |

OTHER PUBLICATIONS

J. Jochum; "Die Thermische Reststoffbehandlung nach dem"; DEGLOR—Verfahren; pp. 1–11 Jun. 1991.

*Primary Examiner*—Scott Kastler
*Attorney, Agent, or Firm*—Oblon, Spivak, McClelland, Maier & Neustadt

[57] ABSTRACT

In a filter dust melting furnace, the waste gases occurring in the interior (9) of the furnace are conducted outward through a waste-gas line (5) in the furnace top. Provided in the course of the waste-gas line is a quench (20) for the abrupt cooling of the waste gas by cold quenching air acting on it. To prevent deposits in the waste-gas line, the quench (6) is arranged in the section of the waste-gas line (5) which directly adjoins the furnace vessel (1) and extends essentially vertically, and means are provided for cooling the quench and the section of the waste-gas line (5) located downstream after the quench.

16 Claims, 5 Drawing Sheets

A-A

WASTE-GAS PIPING FOR A FILTER DUST MELTING FURNACE

BACKGROUND OF THE INVENTION

1. Field of the Invention

The invention relates to waste-gas piping for a melting furnace, in particular a filter dust melting furnace, which comprises a furnace vessel which is made of fireproof material and is provided, at least in the region of the furnace top, with a thermal insulation, the waste gases occurring in the interior of the furnace being conducted outward through a waste-gas line in the furnace top, a quench being provided in the course of the waste-gas line for the abrupt cooling of the waste gas by cold quenching air acting on it.

Waste-gas piping of this generic type is described in the company's publication "Die thermische Reststoffbehandlung nach dem DEGLOR-Verfahren" [The thermal treatment of residues according to the DEGLOR method] by ABB W+E Umwelttechnik, CH-8048 Zurich, undated.

2. Discussion of Background

In the DEGLOR method (DEGLOR is a registered trade mark of the company W+E Umwelttechnik AG, CH-8048 Zurich), filter dust and boiler ash are treated without additives in an electrically heated melting furnace at temperatures of about 1300° C. The residues melt and are discharged from the furnace via a gas-tight syphon and then cooled. During this process, a glass-like residue occurs which can be disposed of without difficulty. During the melting operation, most of the heavy-metal compounds evaporate. Organic pollutants, such as dioxins or furans are destroyed thermally. Non-evaporating, high-boiling metal compounds are incorporated in the glass matrix in a similar manner to lead in lead crystal glass. A ventilator connected downstream of the furnace ensures that the evaporated components are extracted from the furnace.

This waste gas is cooled abruptly at the furnace outlet to values of about 150°–200° C. The new formation of dioxins can thus be prevented. Additionally, the heavy metal compounds still contained in the waste gas condense or desublimate. Said compounds are subsequently separated from the gas flow in a bag filter and are disposed of separately. The non-condensing gas components ($CO_2$, $SO_2$, $HCl$, ...) are fed, together with the quenching air, back into the furnace chamber of the refuse incineration or into the smoke gas cleaning plant.

Hitherto, plants of this type could not be operated without regular cleaning of the waste-gas pipe in the region between the outlet from the melting furnace and the place where the cold air is blown in (quench). Deposits caused by condensate even form in the quench itself. The removal of these deposits is time-consuming and can only be automated at considerable expense (Swiss Patent 677739).

SUMMARY OF THE INVENTION

Accordingly, one object of the invention is to provide novel waste-gas piping for a melting furnace, which piping can be implemented in a substantially maintenance-free, technically simple and economic manner.

This object is achieved according to the invention in that the quench is arranged in the section of the waste-gas line extending essentially vertically and means are provided for cooling the quench and the section of the waste-gas line located downstream after the quench.

The advantage of the invention is to be seen, in particular, in the fact that virtually all heavy-metal and salt compounds condense directly when leaving the furnace vessel in the interior of the quench. No partially liquid condensate is thus formed, which, in the case of waste-gas piping arranged in a horizontal or insufficiently inclined position, could lead to accumulations or even blockages.

In the arrangement of the quench—more precisely the quenching place where the hot waste gas interacts with the cold quenching air—two design variants are generally possible, In the one variant, the quench is placed as far as possible inside the interior of the furnace. In the other variant, it either directly adjoins the furnace top and thus requires virtually no intervention into the construction of the furnace vessel, or the quench enters to a greater or lesser depth into the furnace insulation. In either case (of this second variant), a piece of pipe made of ceramic material must then be provided in order to bridge the gap between the interior of the furnace vessel and the quench.

By means of the vertical arrangement of the waste-gas piping in the quench, liquid condensate, which forms as a thin film on the inner side of the pipe, can flow by itself back into the furnace due to the effect of gravity. This backflow of the liquid condensate is only guaranteed in the second variant if the waste-gas pipe up to the quench is kept at a sufficiently high temperature because solid deposits or crusts due to excessive cooling will otherwise form.

Exemplary embodiments of the invention and the advantages which can be achieved therewith are explained in greater detail below with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
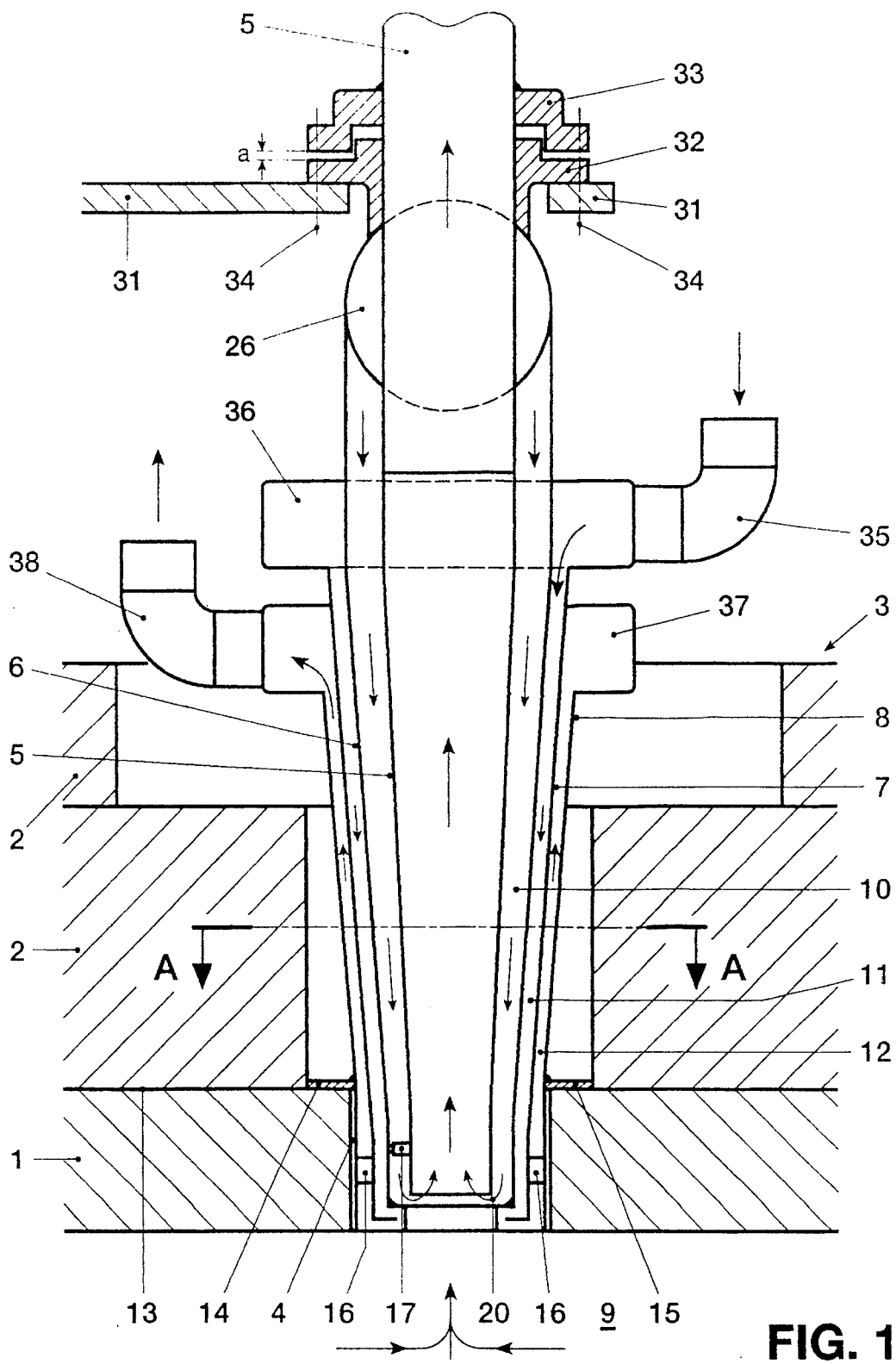
FIG. 1 shows a longitudinal section through the quench and the section of the waste-gas line directly adjoining it.
Figure 2:
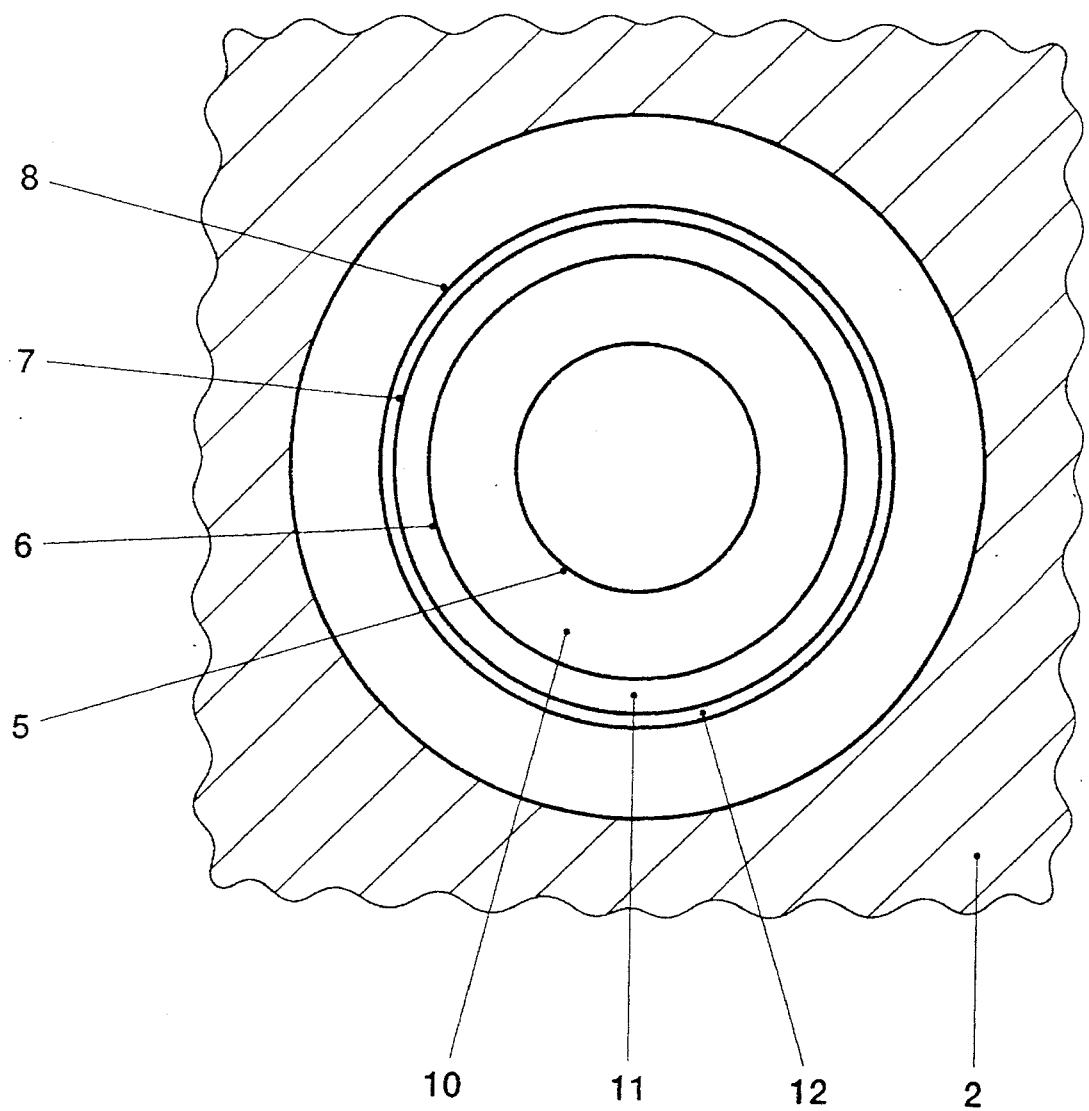
FIG. 2 shows a partially enlarged cross section through the waste-gas line and the furnace top according to FIG. 1 along its line AA.
Figure 3:
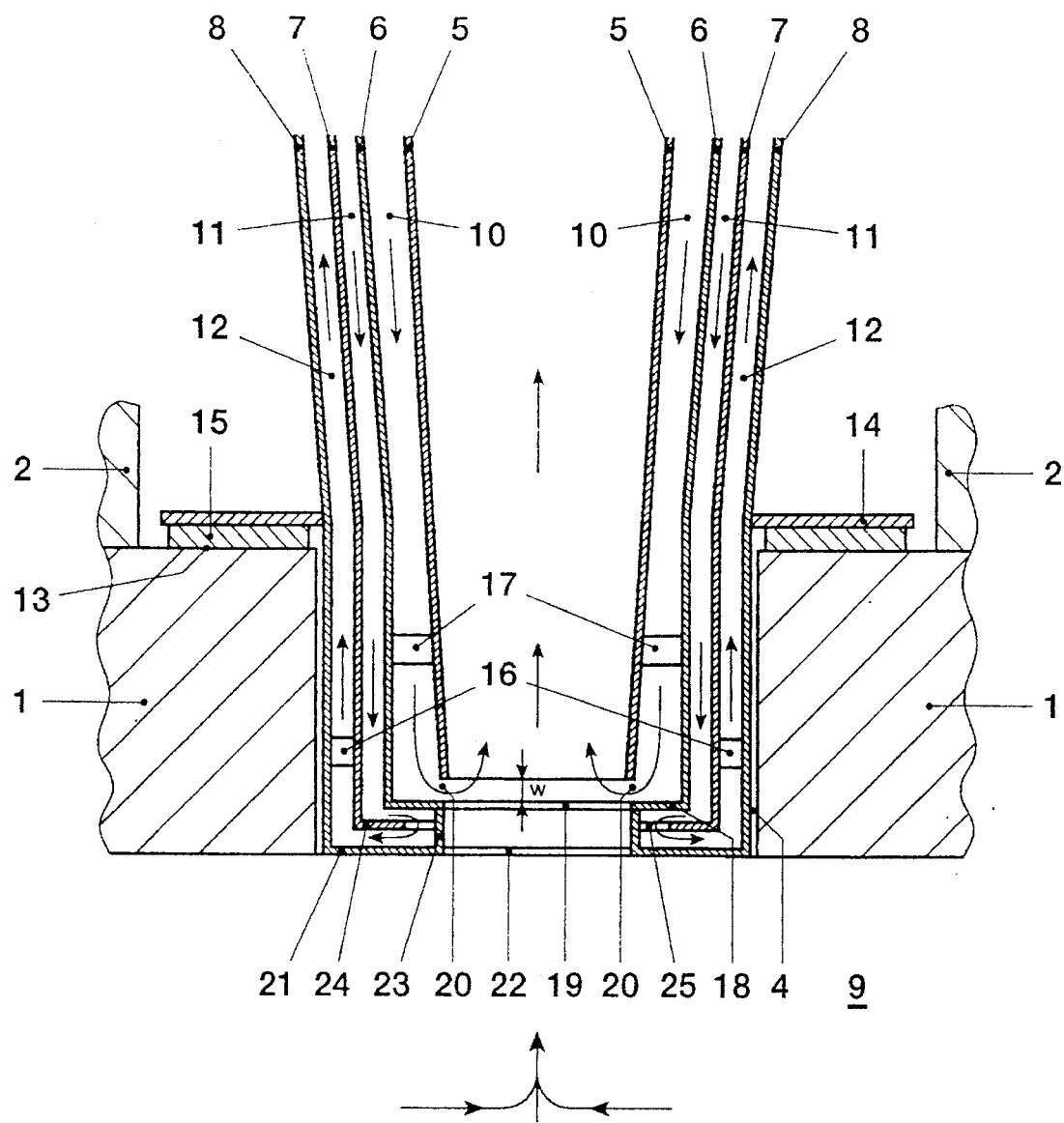
FIG. 3 shows an enlarged section from FIG. 1 in the region of the quenching place.

Referring now to the drawings, wherein like reference numerals designate identical or corresponding parts throughout the several views, in FIGS. 1, 2 and 3 the melting furnace for filter dust comprises a furnace vessel 1 which is made of fireproof material and is surrounded on all sides by a thermal insulation 2 which has multiple layers in this example. Provided in the region of the furnace top 3 is a circular opening 4 which passes through both the vessel casing 1 and the insulation 2, thereby widening toward the top, preferably in steps.

A construction, hereinafter described as a quench, consisting of four coaxial pipes 5, 6, 7 and 8, enters into this opening 4. The quench comprises an inner waste-gas pipe 5 which tapers toward the interior 9 of the furnace and, in relation to the waste-gas flow, forms a diffusor there. The waste-gas pipe 5 is spaced away from a first pipe 6, leaving a first annular space 10 free. The first pipe 6 is surrounded coaxially by a second pipe 7. The second annular space between the two pipes 6 and 7 is denoted by 11. The second pipe 7, in turn, is surrounded coaxially by a third pipe 8; the third annular space formed between the two pipes 7 and 8 bears the reference numeral 12. The third pipe 8 is provided, at the height of the separation point 13 between the top 1 of the furnace vessel and the insulation 2, with an annular flange 14 which rests on the top 1 of the furnace vessel with interposition of an annular seal 15 made of material which is resistant to high temperatures. First spacer elements 16 are provided in the region of the furnace top 1 between the second pipe 7 and the third pipe 8. Second spacer elements 17 secure the coaxial position between the waste-gas pipe 5 and the first pipe 6.

The first pipe 6 is partially closed at the lower end by an annular lid 18, a circular passage surface 19 remaining free with a diameter which corresponds approximately to the outside diameter of the furnace-side end of the waste-gas pipe 5. Remaining between said annular lid 18 and the said pipe end of 5 is an annular gap 20 which is the actual quenching place. The furnace-side end of the third pipe 8 is also partially closed by an annular lid 21 which leaves a passage surface 22 free, which corresponds to that in the annular lid 18. A short piece of pipe 23 connects the two free edges of the annular lids 18 and 21. The furnace-side end 24 of the second pipe 7 is drawn inward and extends up to the said piece of pipe 23 apart from an annular gap 25. In this manner, a free communication, which is necessary for the flow of cooling water, is produced between the second annular space 11 and the third annular space 12. However, the two annular spaces 11 and 12 are closed off relative to the interior 9 of the furnace, the first annular space 10 and the interior of the waste-gas pipe 5.

Figure 4:
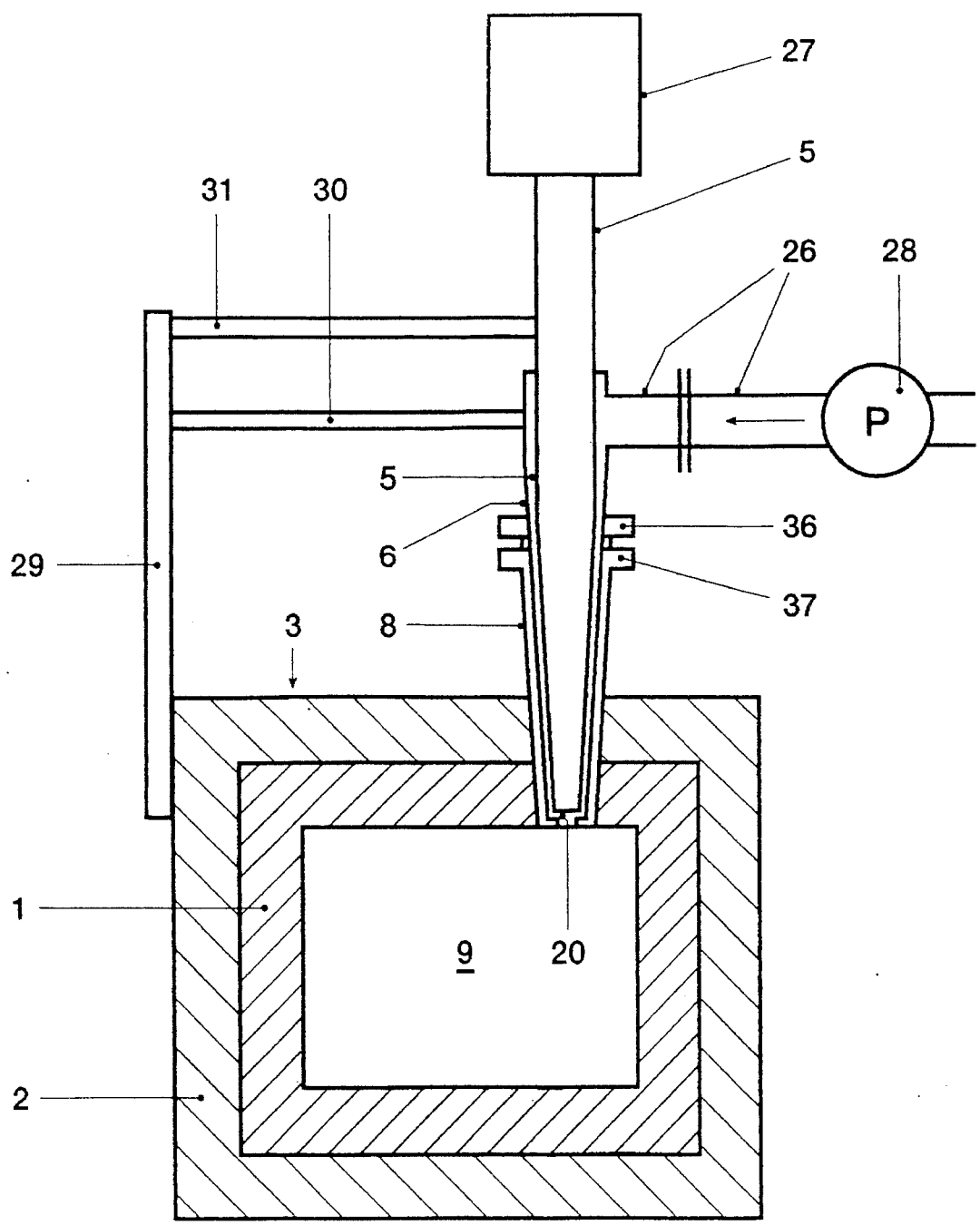
FIG. 4 shows a greatly simplified cross section through a melting furnace for filter residues and its waste-gas piping, the quench thus being arranged directly in the interior of the furnace.

As can be seen in FIG. 4 in conjunction with FIG. 1, the (cold) quenching air is fed via a fresh-air line 26 to the first annular space 10. Said quenching air flows through the first annular space 10 up to the quenching place (annular gap 20), where it mixes with the hot waste-gas flow from the interior of the furnace and abruptly cools said flow. During this process, the sharp inlet edge at the furnace-side end of the waste-gas pipe 5 provides additional turbulences and enhances this effect. Together with the furnace-side end section of the waste-gas pipe 5, which widens in the manner of a diffusor (in the flow direction), it is achieved that the sublimate of the metal vapors forming in the region of the quench is not deposited on the inner side of the pipe and does not bake on there. The conveying of the waste gas and of the quenching air takes place by means of a ventilator after the filter stage 27. In order that sufficient fresh air is always available at the quenching place, it is advantageous to install a fan 28 in the fresh-air line 26 to increase the pressure. Said fan increases the flow speed at the quenching place 20 and also produces relatively strong turbulences in this region, thus increasing the quenching effect.

In addition to the quantity of fresh air flowing through the quenching place (annular gap 20), the mixing temperature of the waste gas and thus also the efficiency of the sublimation are influenced by the gap width (FIG. 3) of the annular gap 20. In order to be able to adapt said gap width to the respective conditions, it is advantageous to design the waste-gas pipe 5 so as to be vertically displaceable relative to the first pipe 6. For this purpose, the holder of the quench consisting of a bearing column 29 and bearing arms 30, 31 can be designed in such a way that the bearing arm 31 for the waste-gas pipe 5 is vertically adjustable relative to the bearing arm 30 for the other pipes 6, 7, 8. Another possibility provides for the waste-gas line 5 to be attached separately from the pipes 6 and 7 and also separately from the fresh-air line 26. For this purpose, the waste-gas pipe 5 is surrounded, at the height of the bearing arm 31, displaceably by a first bearing flange 32 which is firmly connected to the fresh-air line 26 and is attached to the bearing arm 31. The waste-gas pipe 5 is connected to a second bearing flange 33 which lies above the first bearing flange 32. By means of adjusting screws 34 and/or spacer disks (not illustrated) which can, at the same time, also serve to attach the first bearing flange 32 to the bearing arm 31, the distance a between the two flanges 32 and 33 and thus also the gap width w at the quenching place (annular gap 20) can be adjusted.

At the temperatures of 1300° C. and above, prevailing in the interior 9 of the furnace, the components of the quench generally consisting of metal are subjected to extremely high loading. For this reason, it is essential to cool these components. According to the invention, this takes place by guiding cooling water through the annular spaces 11 and 12 between the pipes 6, 7 and 7 and 8 respectively. The cooling water is fed to the annular space 12 via an inlet nozzle 35 which opens out into a first annular collection chamber 36 which is adjoined by the annular space 12. The cooling water flows through said annular space 12 right down to the quenching place (annular gap 20), is deflected there, flows through the annular space 11, passes to a second annular collection chamber 37, and leaves the latter via an outlet nozzle 38.

This conducting of cooling water on the one hand prevents excessive thermal loading of the metal components of the quench in relation to the heat radiated from the insulation 2 and from the furnace vessel 1. In this case, owing to the conducting of the cooling water right up to the annular gap 20, the actual quenching place is also optimally cooled. The cooling water flowing back in the annular space 11 cools the pipe 6 which forms the outer boundary of the annular space 10. As a result, excessive heating of the quenching air flowing through the annular space 10 is also prevented, such that, in this manner, deposits on the inner side of the waste-gas pipe 5 are avoided.

Figure 5:
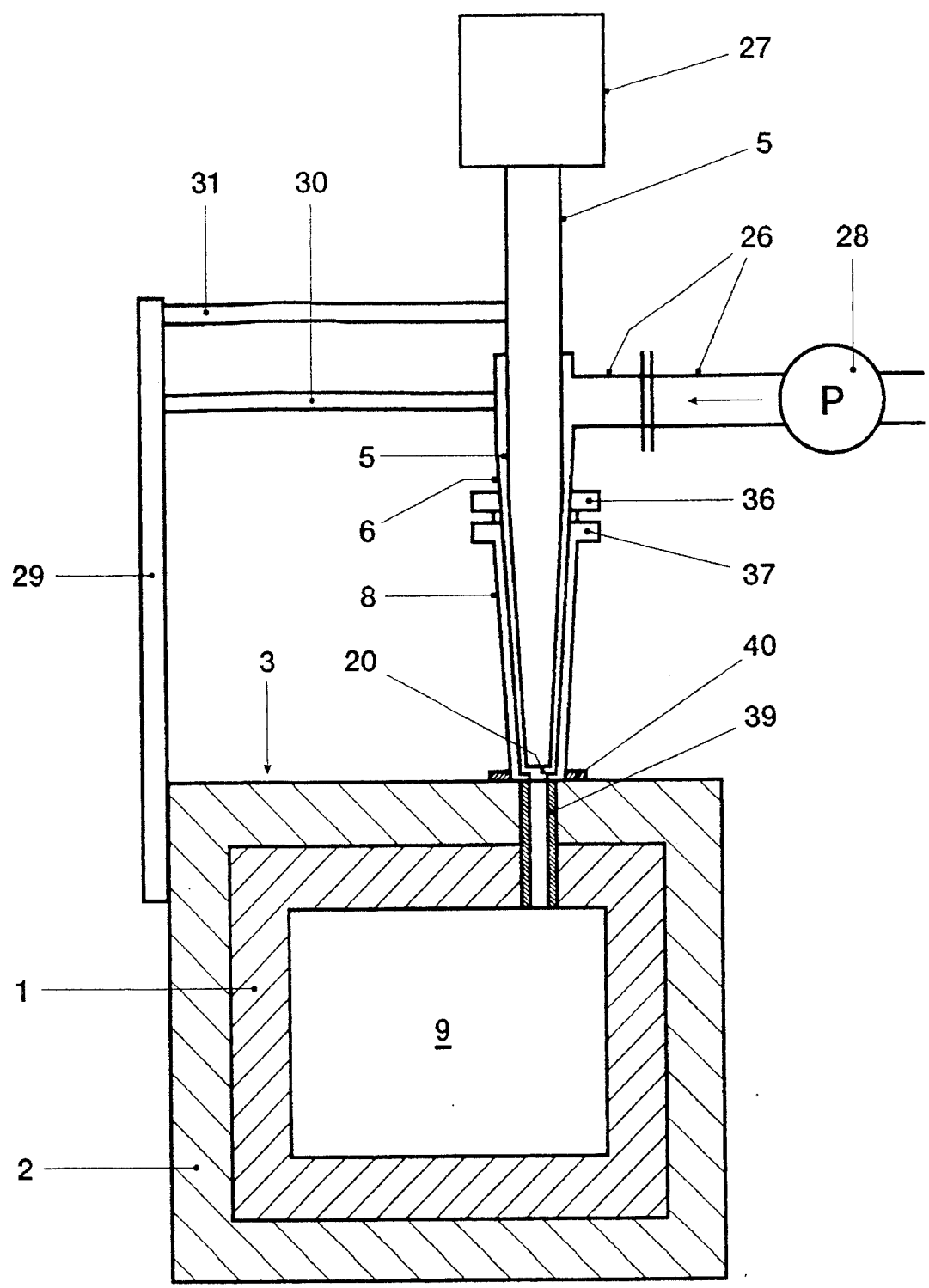
FIG. 5 shows a greatly simplified cross section through a melting furnace for filter residues and its waste-gas piping, the quench being arranged directly on the outer surface of the furnace vessel.

The arrangement of the actual quenching place at the outlet of the gases and vapors from the interior of the furnace requires an intervention into the furnace construction in the region of the furnace top. However, the quench according to the invention can also be retrofitted in existing melting furnace plants, such as is depicted in FIG. 5. Such furnaces usually have a pipe 39 made of ceramic which is resistant to high temperatures, which pipe passes through the furnace wall 1 and the insulation 2. The quench is now fitted directly onto the outer surface of the insulation 2 flush with the ceramic pipe 39, it being possible for a protective ring 40 to be provided for sealing. In this embodiment, too, a bearing construction is provided in analogy to that of FIG. 4 and consisting of a bearing column 29 and two bearing arms 30, 31, and means are provided for changing the gap width of the annular gap 20 in analogy to FIG. 1 and FIG. 4.

Of course, the invention is not restricted to the embodiments illustrated in the drawings. For example the quench can extend deeper into the insulation 2, for example it can lie at the height of the separating plane between the vessel wall 1 and the insulation 2. If the space conditions do not allow otherwise, the quench can also be arranged laterally on the furnace, extending horizontally in borderline cases.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A waste gas piping for a melting furnace which includes a furnace vessel made of a fireproof material and thermal insulation at least in a region of a furnace top, the waste gas piping comprising:

a central waste gas pipe;

a first pipe surrounding said central waste gas pipe, with a first annular space between said central waste gas pipe and said first pipe;

a second pipe surrounding said first pipe, with a second annular space between said first pipe and said second pipe;

a third pipe surrounding said second pipe, with a third annular space between said second pipe and said third pipe;

an annular gap disposed at a furnace-side end of said waste gas piping, said annular gap providing communication between said first annular space and an interior of said central waste gas pipe;

means for supplying a cold quenching air to said first annular space such that said cold quenching air cools a portion of said central waste gas pipe and is fed through said first annular space to said annular gap to provide a quench location in a region of said annular gap to quench a waste gas flowing into said central waste gas pipe; and means for supplying a cooling liquid into said second annular gap and for collecting the cooling liquid from said third annular gap such that the cooling liquid flows in the second annular gap to a location adjacent the annular gap and such that the cooling liquid flows away from said location adjacent the annular gap through said third annular space.

2. The waste-gas piping as claimed in claim 1, wherein the second annular space and the third annular space extend up to the location adjacent the annular gap and are in free communication with one another at said location adjacent the annular gap.

3. The waste-gas piping as claimed in claim 1, wherein the central waste-gas pipe is displaceable relative to the first, second and third pipes in a longitudinal direction to adjust a width of said annular gap.

4. The waste-gas piping as claimed in claim 1, wherein the central waste-gas pipe, together with the first, second and third pipes, enter at least partially into the thermal insulation of the furnace vessel.

5. The waste-gas piping as claimed in claim 1, wherein the central waste-gas pipe widens in the manner of a diffusor in a flow direction of the waste gas.

6. The waste-gas piping as claimed in claim 1, wherein means are provided for eddying the quenching air.

7. The waste-gas piping as claimed in claim 2, wherein the central waste-gas pipe, together with the first, second and third pipes, enter at least partially into the thermal insulation of the furnace vessel.

8. The waste-gas piping as claimed in claim 3, wherein the central waste-gas pipe, together with the first, second and third pipes, enter at least partially into the thermal insulation of the furnace vessel.

9. The waste-gas piping as claimed in claim 2, wherein the central waste-gas pipe widens in the manner of a diffusor in a flow direction of the waste gas.

10. The waste-gas piping as claimed in claim 3, wherein the waste-gas pipe widens in the manner of a diffusor in a flow direction of the waste gas.

11. The waste-gas piping as claimed in claim 4, wherein the waste-gas pipe widens in the manner of a diffusor in a flow direction of the waste gas.

12. The waste-gas piping as claimed in claim 2, wherein means are provided for eddying the quenching air.

13. The waste-gas piping as claimed in claim 3, wherein means are provided for eddying the quenching air.

14. The waste-gas piping as claimed in claim 4, wherein means are provided for eddying the quenching air.

15. The waste-gas piping as claimed in claim 5, wherein means are provided for eddying the quenching air.

16. The waste-gas piping as claimed in claim 1, wherein said annular gap has a width, and wherein said waste gas piping includes means for adjusting said width of said annular gap.

* * * * *